United States Patent [19]
Weimer et al.

[11] Patent Number: 5,692,285
[45] Date of Patent: Dec. 2, 1997

[54] BUTT FUSION APPARATUS WITH MEANS FOR CHANGING QUICKLY BETWEEN STRAIGHT PIPE AND PIPE FITTING ATTACHMENT POSITIONS, AND METHOD

[75] Inventors: James Collen Weimer, Charleston; Jack Lee Workman, Alum Creek; Gary Wayne Gunno, Charleston, all of W. Va.

[73] Assignee: Workman Developments, Inc., Alum Creek, W. Va.

[21] Appl. No.: 551,119

[22] Filed: Oct. 31, 1995

[51] Int. Cl.[6] ............... B23P 17/00; B29C 65/02; B25B 1/20
[52] U.S. Cl. ............... 29/401.1; 156/304.2; 269/43
[58] Field of Search ............... 29/401.1, 272, 29/281.5; 156/304.6, 304.2, 503; 414/910; 410/47; 269/43; 228/49.3

[56] References Cited

U.S. PATENT DOCUMENTS

| | | |
|---|---|---|
| 3,400,030 | 9/1968 | Burger. |
| 3,561,320 | 2/1971 | Nelson ............... 29/272 |
| 3,729,360 | 4/1973 | McElroy. |
| 3,846,208 | 11/1974 | McElroy. |
| 4,071,395 | 1/1978 | McElroy. |
| 4,263,084 | 4/1981 | Takala. |
| 4,310,376 | 1/1982 | Ebina et al.. |
| 4,345,956 | 8/1982 | Cox et al.. |
| 4,352,708 | 10/1982 | McElroy. |
| 4,484,975 | 11/1984 | McElroy. |
| 4,769,889 | 9/1988 | Landman et al. ............... 269/43 |
| 4,957,570 | 9/1990 | Jenkins et al.. |
| 4,990,209 | 2/1991 | Rakes ............... 156/503 |
| 5,013,376 | 5/1991 | McElroy, II et al.. |
| 5,078,827 | 1/1992 | Calderwood. |
| 5,124,533 | 6/1992 | Dommer et al.. |

OTHER PUBLICATIONS

Christie Manufacturing Inc.; Polyethylene Pipe Butt Fusion Machines; p. 1; (No date listed); Frisco, TX.
Christie Manufacturing Inc.; Model 810 Butt Fusion Machine; p. 1 & 2; (No date Listed); Frisco, TX.
Christie Manufacturing Inc.; Model 1410 Butt Fusion Machine; p. 1 & 2; (No date listed); Frisco, TX.
Christie Manufacturing Inc.; Model 1810 Butt Fusion Machine; p. 1 & 2; (No date listed); Frisco, TX.
Christie Manufacturing Inc.; Model 2410 Butt Fusion Machine; p. 1 & 2; (No date listed); Frisco, TX.

Primary Examiner—S. Thomas Hughes
Assistant Examiner—Tisa Stewart
Attorney, Agent, or Firm—Adams Law Firm, P.A.

[57] ABSTRACT

An apparatus for attaching abutting ends of first and second coaxial pipe sections together which includes a pivot assembly mounting a clamping jaw for pivotal movement between a raised, coaxial pipe-clamping position and a lowered position for permitting a fitting which would otherwise interfere with the clamping jaw to be attached to another pipe section.

11 Claims, 6 Drawing Sheets

BUTT FUSION APPARATUS WITH MEANS FOR CHANGING QUICKLY BETWEEN STRAIGHT PIPE AND PIPE FITTING ATTACHMENT POSITIONS, AND METHOD

TECHNICAL FIELD AND BACKGROUND OF THE INVENTION

This invention relates to a butt fusion apparatus for joining fabricated or molded thermally-joinable pipe fittings to a thermally joinable pipe. The invention disclosed in this application relates to a means for removing machine interference when fusing plastic pipe to plastic pipe fittings, such as tees or elbows. However, the apparatus can also be used for the alignment of large metal pipes prior to arc welding. The apparatus is adaptable to pipes having a wide range of diameters. The example disclosed in this application has jaws capable of accommodating pipe up to 60 inches (153 cm) in diameter.

Since the pipe sections and fittings are coaxially-aligned and joined at abutting peripheral end edge surfaces, these machines are referred to as "butt fusion" machines. These machines must perform two complementary joining functions-joining long runs of straight pipe sections, interspersed with tees, elbows, transitions between differing sizes, and other fittings.

The rapidly expanding use of plastic pipe to form pipelines in the industrial, commercial and municipal industries has given rise to a need to quickly add fittings to the pipe during it's installation. Prior art machines have fixed jaws which are spaced together in such a way that the fitting cannot be placed into the machine in its typical configuration because the jaw on the machine interferes with the cross-piece of the fitting.

Prior art machines allow the fusion of fittings into the run of pipe, but either require a time-consuming removal of the interfering jaw or require that the fittings be provided with long, straight lengths on the fitting ends or branches so that the cross-piece extends out beyond the jaw. All of the present practices add considerable expense to the addition of a fitting to a pipe.

The invention of this application significantly reduces the time and expense associated with current practice by allowing the jaw to be quickly hinged from the raised, interfering position into a lowered position out of the way of the fitting.

SUMMARY OF THE INVENTION

Therefore, it is an object of the invention to provide a butt fusion machine which has a pivotable jaw which can be quickly moved out of an interfering position when fittings are being joined to a pipe section.

It is another object of the invention to provide a butt fusion machine which includes means for lowering and raising the jaw.

These and other objects of the present invention are achieved in the preferred embodiments disclosed below by providing an apparatus for attaching abutting ends of first and second coaxial pipe sections together, which includes a support frame; first and second coaxially-aligned pipe clamping jaws carried by the support frame in a raised position for positioning the first pipe section in a fixed position, and at least one axially-movable pipe clamping jaw carried by the support frame for axial movement of the second pipe section relative to the fixed clamping jaws and into abutment with the first pipe section for being joined thereto. Joining means are provided for joining the first and second abutted pipe sections together. The improvement according to the invention comprises pivot means mounting a first, fixed clamping jaw for pivotal movement between the raised, coaxially aligned pipe-clamping position and a lowered position for permitting a fitting which would otherwise interfere with the first, fixed clamping jaw to be attached to the second pipe section.

According to one preferred embodiment of the invention, the pivot means comprises first and second laterally-spaced brackets fixed to the support frame and defining a pivot axis perpendicular to the longitudinal axis of the first and second coaxial pipe sections.

According to another preferred embodiment of the invention, the brackets include first and second coaxial hinge pins secured to the first clamping jaw and extending through hinge pin bores in respective brackets, and further wherein the pivot axis is adjacent to an end of the second clamping jaw in the direction of pivot into the lowered position.

According to yet another preferred embodiment of the invention, the pivot means includes a mounting plate mounted on the support frame and extending laterally across the width of the machine from one of the brackets to the other of the brackets. A base plate is carried by the first, fixed clamping jaw and extends laterally from one of the brackets to the other of the brackets and pivots between the first position wherein the base plate is positioned in overlying alignment with the mounting plate, and the second position wherein the base plate is pivoted away from the mounting plate. Locking means are provided for locking the base plate in overlying alignment with the mounting plate when the first, fixed clamping jaw is positioned in the raised, coaxial pipe-clamping position.

According to yet another preferred embodiment of the invention, pipe support means are pivotally mounted on the support frame for supporting the first pipe section in coaxial position with the second pipe section in the raised position. The pipe support means are pivotable into a lowered position for supporting the first clamping jaw in its lowered position.

According to yet another preferred embodiment of the invention, the pipe support means includes hydraulic movement means for lowering the first clamping jaw in its lowered position and raising the first clamping jaw into its raised position.

According to yet another preferred embodiment of the invention, the pipe support means comprises a pair of arms laterally mounted by a first end of the arms in spaced-apart relation on the support frame and a roller mounted on an opposing, second end of the arms.

Preferably, the apparatus is adapted to thermally fuse plastic pipe and pipe fittings.

According to another embodiment of the invention, a method is provided for quickly adapting an apparatus for attaching abutting ends of first and second coaxial pipe sections together to a configuration for attaching a pipe fitting to the second coaxial pipe section. The apparatus includes a support frame, first and second coaxially-aligned pipe clamping jaws carried by the support frame in a raised position for positioning the first pipe section in a fixed position and at least one axially-movable pipe clamping jaw carried by cylinders mounted on the support frame for axial movement of the second pipe section relative to the fixed clamping jaws and into abutment with the first pipe section for being joined thereto. Joining means join the first and second abutted pipe sections together. The method step comprises pivoting the first clamping jaw between the raised, coaxial pipe-clamping position and a lowered position for permitting a fitting which would otherwise interfere with the first clamping jaw to be attached to the second pipe section.

An embodiment of the method according to the invention comprises the step of locking the first clamping jaw in the raised, coaxial pipe-clamping position.

An embodiment of the method according to the invention comprises the step of supporting the first pipe section in the first, fixed jaw in the raised position together with the second fixed jaw.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description

Figure 1:
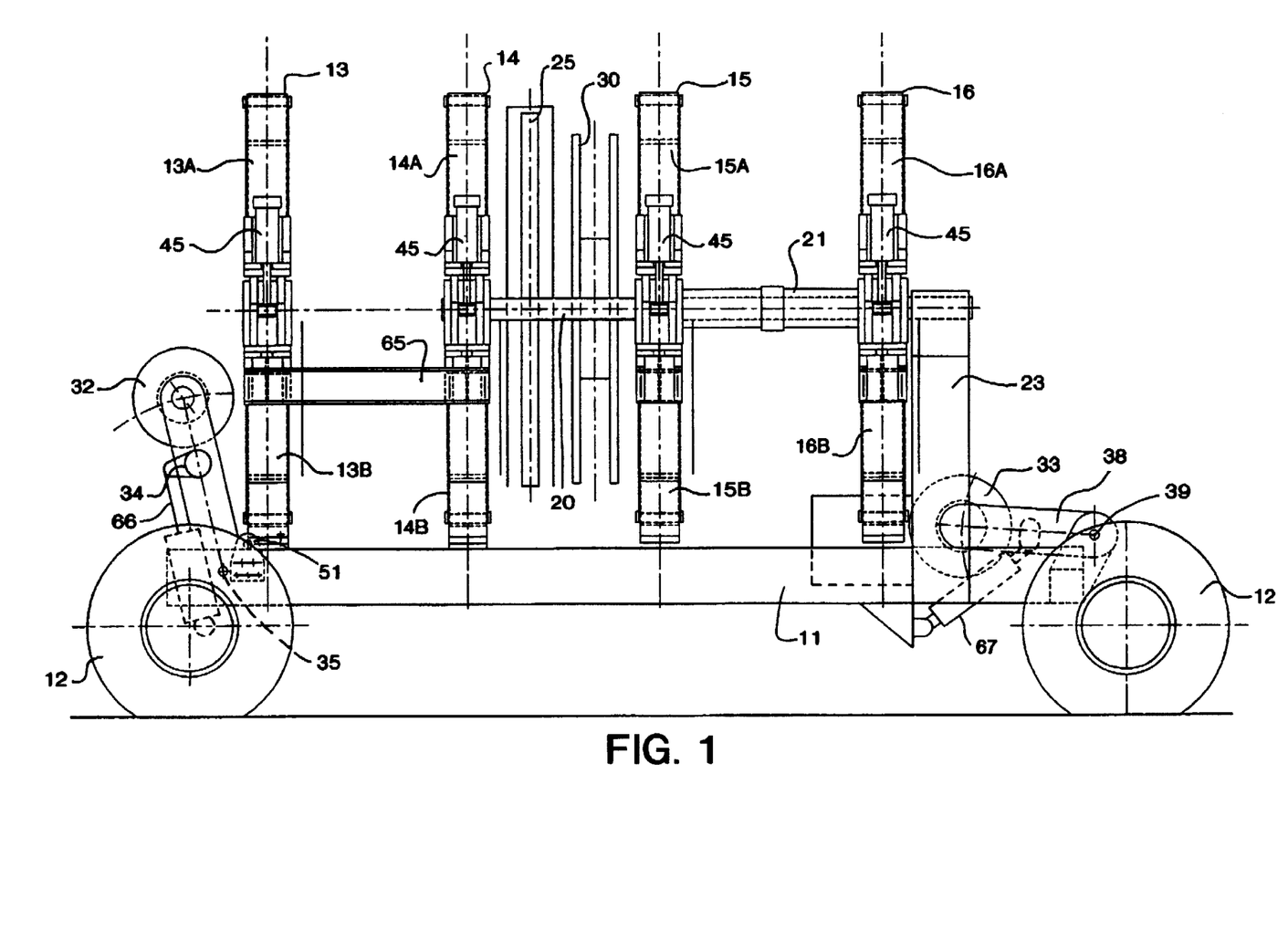
FIG. 1 is a simplified side elevation of a butt fusion machine according to a preferred embodiment of the present invention with the pivotable jaw in its raised position and with all jaws positioned for fusing straight pipe sections.

Referring now specifically to the drawings, a butt fusion machine according to the present invention is illustrated in FIG. 1 and shown generally at reference numeral 10. The butt fusion machine 10 may be fixed or mobile. The butt fusion machine 10 shown in FIG. 1 is a mobile unit, and includes a support frame 11, mounted on four wheels 12 (two shown), which allow the butt fusion machine 10 to be towed from job site to job site and to be self-propelled on the job site as the pipeline is assembled.

Four pipe clamping jaws 13, 14, 15 and 16 are mounted and carried in spaced-apart relation on the support frame 11. Jaws 13 and 14 are fixed in relation to jaws 15 and 16, which are movable and translate along the longitudinal axis of the butt fusion machine 10 by the action of the guide rod cylinders 20, 21.

Each of the jaws 13-16 are formed of upper and lower halves 13A,13B, 14A, 14B, 15A,15B and 16A,16B hinged to each other, as described in further detail below, so that they may be opened for placing pipe sections in, and removing pipe sections from, the jaws 13-16.

Figure 2:
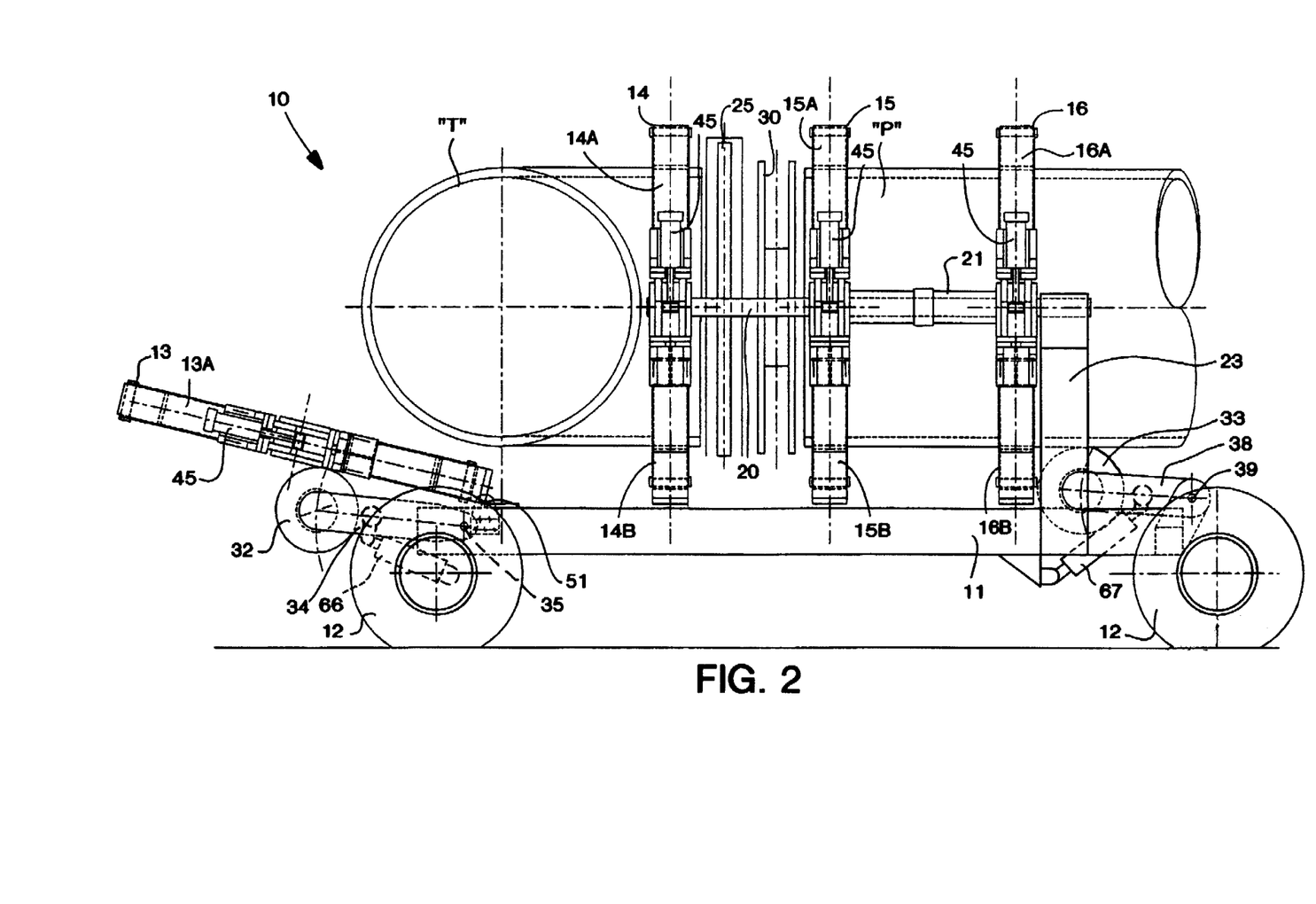
FIG. 2 is a simplified side elevation of a butt fusion machine according to a preferred embodiment of the present invention with the pivotable jaw in its lowered position for fusing a tee fitting.

For purposes of illustration, FIG. 2 shows a length of straight pipe section "P" positioned in the movable jaws 15 and 16, and a short "tee" fitting "T" positioned in fixed jaw 14.

Referring to FIGS. 1 and 2, the moving jaws 15 and 16 translate along the longitudinal axis of the butt fusion machine 10 by the combined action of rods 20 and cylinders 21, which are positioned on opposite, lateral sides of the jaws 15 and 16. Rods 20 are vertically supported at one end by fixed jaw 14 and on the other end by a rear cylinder support assembly 23.

A heating assembly 25 is provided on the machine for heating the ends of pipe "P" and fitting "T" prior to joining. A facing tool 30 squares the pipe ends before joining. Both the heating assembly 25 and facing tool 30 are pivotally-mounted on one side of the frame support 11 and are moved laterally about a pivot axis into and out of a position between the ends of the pipe "P" and fitting "T" to be fused. The facing tool 30 is a disc-shaped cutter having a pair of radially-extending cutter blades on opposite sides of the tool. Rotation of the cutter blades allows abutting ends of the pipe "P" and fitting "T" to be trimmed into parallel alignment in order to achieve an exact, even fusion. After facing the pipe "P" and fitting "T", the facing tool 30 is retracted and the heating assembly 25 is rotated into position. Opposing non-stick surfaces evenly heat the abutting ends of the pipe "P" and fitting "T" to fusion temperature. These processes are described in further detail below.

Pipe rollers 32 and 33 are carried by the frame and assist in moving two pipe sections into and out of fusing position when the butt fusion machine 10 is being operated to butt fuse two straight pipes. Pipe roller 32 includes a pair of arms 34 mounted by pivot brackets 35 to frame 11 and is hydraulically-powered by a piston and cylinder assembly 66 to move upwardly and downwardly as needed to raise and lower the section of pipe being held in clamping jaws 13 and 14. Pipe roller 33 includes a pair of arms 38 mounted by pivot brackets 39 to frame 11 and is hydraulically-powered by a piston and cylinder assembly 67 to move upwardly and downwardly as needed to raise and lower the section of pipe being held in clamping jaws 15 and 16. Other types of pipe adjusting means can be used, as well.

DETAILED DESCRIPTION OF CLAMPING JAWS

Figure 3:
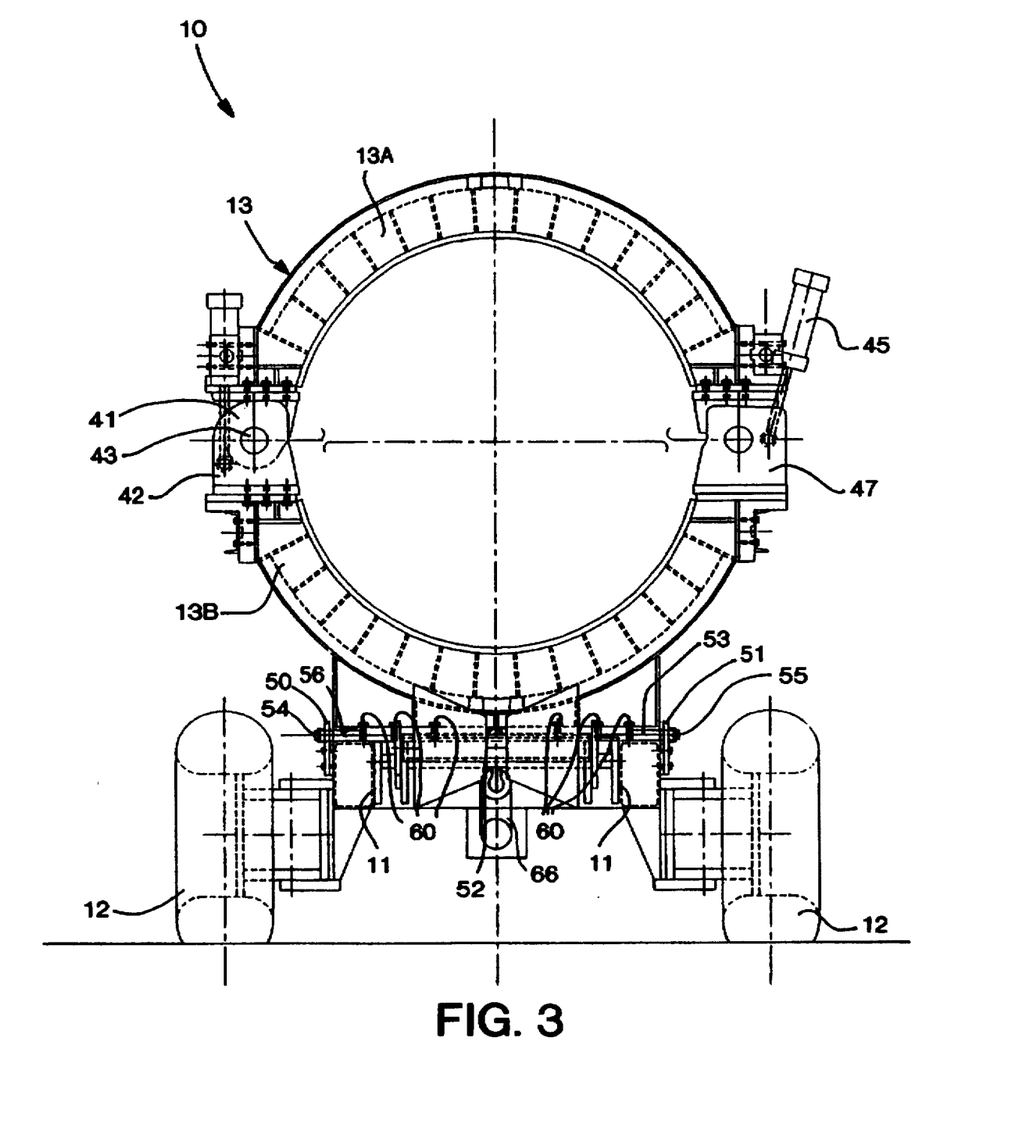
FIG. 3 is a front elevation of the butt fusion machine of FIGS. 1 and 2.

Referring now to FIG. 3, upper and lower clamping jaw halves 13A, 13B are shown. Clamping jaws 14, 15 and 16 are constructed in the same manner, and the description of operation of the upper and lower jaw halves which follows applies to jaw 14, 15, and 16, as well. As is shown, jaw 13 is mounted transverse to the longitudinal axis of the butt fusion machine 10, and clamps a pipe "P" in a position whereby it can be fused to a length of pipe "P" clamped in the movable jaws 15 and 16, as described above. Alternately, a fitting "T" can be clamped in jaw 14 after jaw 13 is placed in its lowered position, and the fitting butt fused to the end of another pipe "P" clamped in the movable jaws 15 and 16, as described above.

Upper jaw half 13A pivots about an axis defined by a pivot brackets 41 and 42 about a pivot shaft 43. Clamping takes place on the opposite side of the jaw 13, where a piston and cylinder assembly 45 attached to a clamping assembly 47 applies hydraulic clamping pressure to a pipe "P" or fitting "T" positioned in the jaw 13 through the rotational movement of the top clamp half 13A.

Jaw 13 is pivoted on an axis perpendicular to the longitudinal axis of the pipe "P", so that it can be moved into a lowered position, shown in FIG. 2, when a fitting "T" is being joined to a pipe "P" being held by the jaws 15 and 16. Laterally-spaced brackets 50 and 51 permit jaw 13 to rotate between the raised position shown in FIG. 1 and the lowered position shown in FIG. 2. In FIG. 1 a straight pipe "P" will be clamped in the jaws 13 and 14. In FIG. 2, a fitting "T" is shown positioned in jaw 14.

Figure 4:
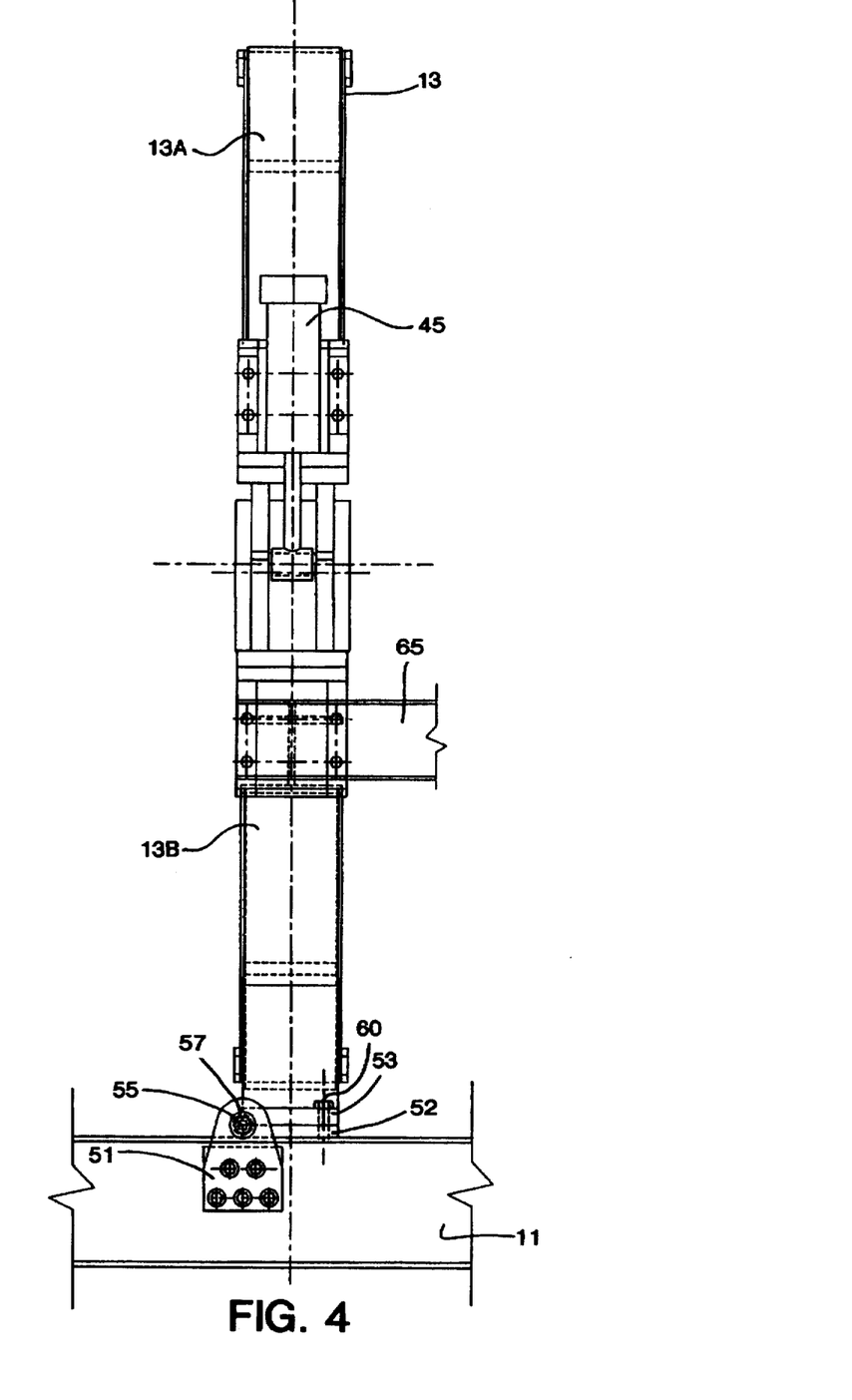
FIG. 4 is a fragmentary side elevation of the pivotable jaw assembly shown in FIGS. 1, 2 and 3.

As is shown in FIG. 3, the brackets 50 and 51 interconnect a jaw mounting plate 52 carried by the support frame 11 and a base plate 53 mounted to the lower jaw half 13B. See also FIG. 4, which shows the bracket 51 in relation to its position to the vertical centerline of the clamping jaw 13.

Figure 5:
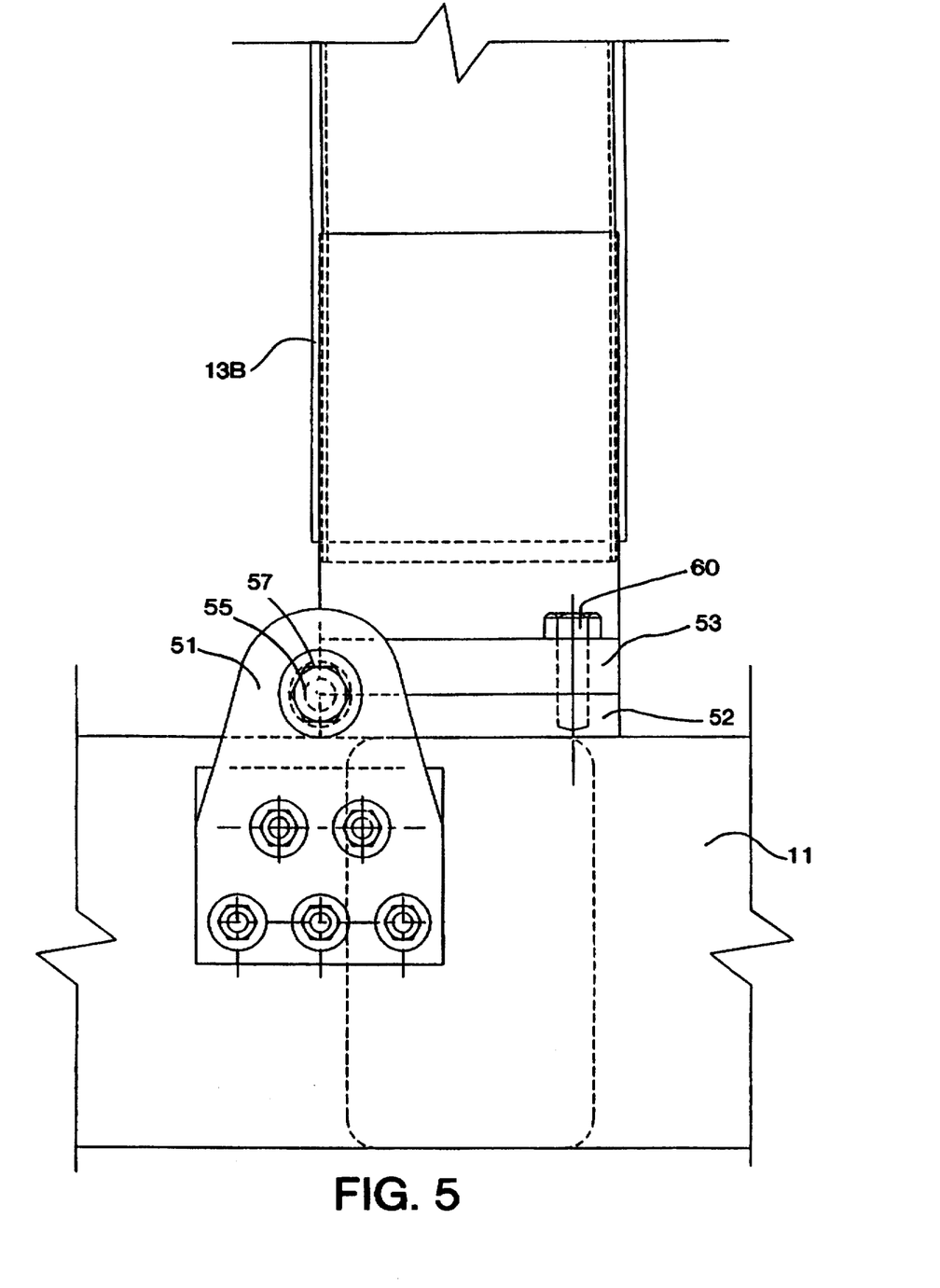
FIG. 5 is an enlarged, fragmentary side elevation of the pivot assembly of the jaw assembly of FIG. 4.
Figure 6:
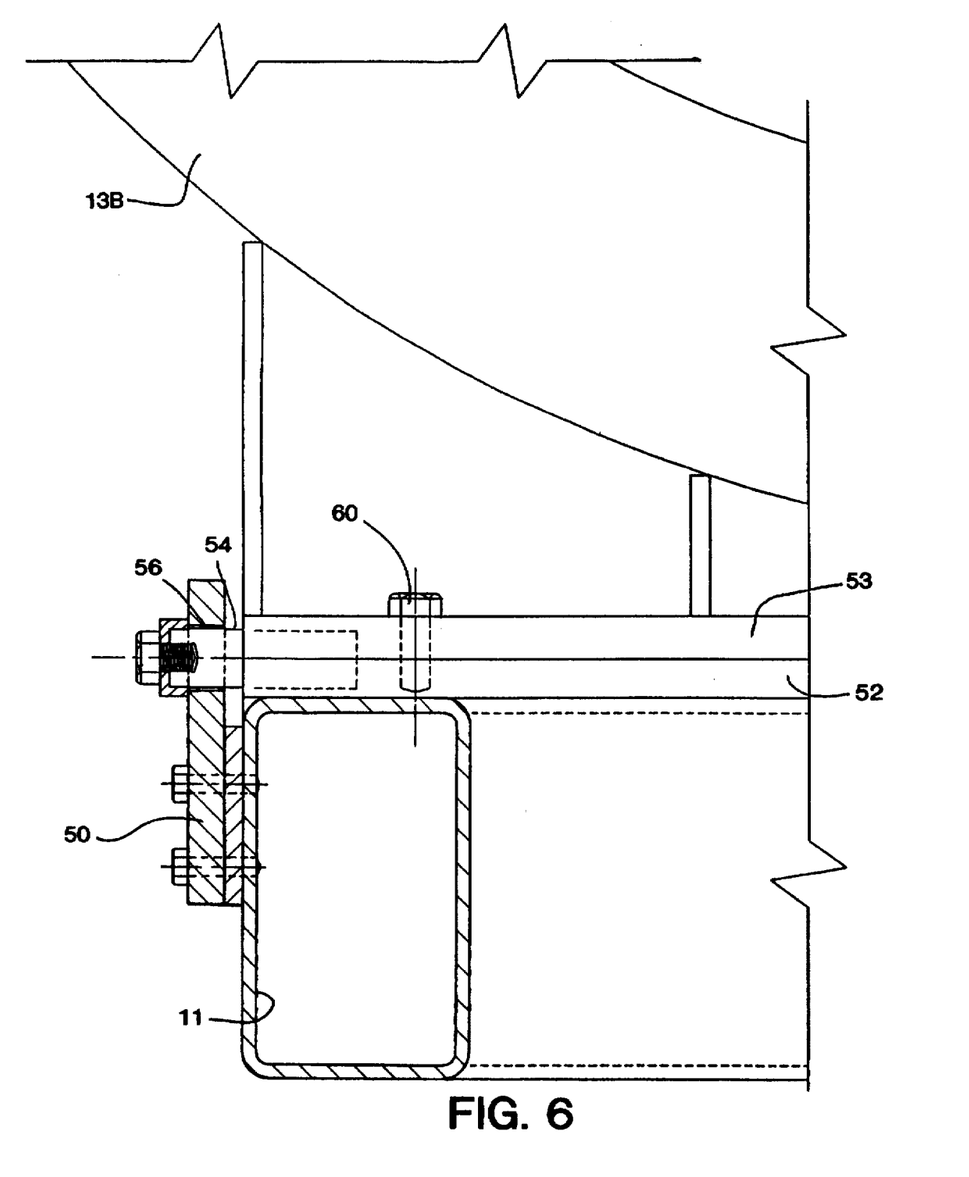
FIG. 6 is an enlarged, fragmentary front elevation of the pivot assembly shown in FIG. 5.

As is best shown by reference to FIGS. 3 and 5, brackets 50 and 51 are mounted to the support frame 11 and provide the pivoting center for respective hinge pins 54 and 55 which are mechanically attached to the base plate 53. The common center of the hinge pins 54 and 55 is located at the intersection of corner lines formed by the vertical side of base plate 53 of the jaw 13 and the common line formed by the mounting plate 52 of the support frame 11 and the bottom horizontal surface of the base plate 53. This location is variable depending on the requirements of the apparatus.

The hinge pins 54 and 55 rotate pivotally through the respective brackets 50, 51, which are fitted with bearings 56, 57 and mechanically fastened to the base plate 53 which is in turn fastened to the support frame 11 by bolts 60 which extend through the mounting plate 52 when the jaw 13 is in its raised position, as shown in FIGS. 1, 3, 4, 5 and 6. The bolts 60 serve as a locking means when in the jaw 13 is in the raised position. Other types of devices may also be used to lock the jaw 13 in its raised position.

Operation of Butt Fusion Machine Straight Pipe Fusion

Referring again to FIG. 1, butt fusion machine 10 is shown in the position in which sections of straight pipe are butt fused together. A pipe section is inserted into the movable jaws 15 and 16 when the upper jaw halves 15A and 16A are pivoted away from the lower jaw halves 15B and 16b. The roller 33 may be used to move the pipe into the jaws 15 and 16, and to lift the pipe to the proper height. After the pipe section is properly positioned, the upper jaw halves 15A, 16B are closed and hydraulically locked into place through the action of the cylinder assemblies 45.

A pipe section is inserted into the stationary jaws 13 and 14 when the upper jaw halves 13A and 14A are pivoted away from the lower jaw halves 13B and 14b. The roller 32 may be used to move the pipe into or out of the jaws 13 and 14, and to lift the pipe to the proper height. After the pipe section is properly positioned, the upper jaw halves 13A, 14A are closed and mechanically locked into place around the pipe by the hydraulic cylinder assemblies 45 so that the pipe is immovably held.

Fine adjustments are made to place both pipe sections in exact axial alignment with each other and at an exact distance from each other. After alignment of the pipes are completed, the facing tool 30 is pivoted into the space between the pipes and rotated to properly face the pipes to provide a perfectly flat, properly aligned face on the pipe surfaces to be butt fused.

After facing takes place, the pipe in the movable jaws 15 and 16 is repositioned and the heating assembly 25 is pivoted into the space between the pipes and the edges of the pipe are heated to the proper temperature. When proper temperature has been reached, the heating assembly 25 is pivoted out of the space between the pipes, and the pipe in the movable jaws 15 and 16 is shifted axially forward towards the stationary pipe in jaws 13 and 14. When the adjacent edges of the pipes meet, the melted plastic merges, and forms a completely integrated, unitary mass and a uniform circumferential fusion bead forms on both sides of the joint. This position is held until the plastic has cooled and hardened. The jaws 13–16 are opened and the butt fusion machine 10 is driven forward along the pipeline run to a point forward of the joint in preparation for the next section of pipe.

Pipe Fitting Fusion

Referring again to FIG. 2, the tee-shaped pipe fitting "T" is shown positioned in fixed jaw 14 in preparation for being joined to conventional straight pipe section "P". In preparation for this procedure, the fixed jaw 13 is lowered from the raised position shown in FIG. 1 into the lowered position shown in FIG. 2. This is accomplished by first removing stiffeners 65 which connect jaws 13 and 14 on opposite sides of the butt fusion machine 10, and then the bolts 60 which extend through the base plate 53 and the mounting plate 52 and the pivot plate 53, locking the jaw 13 into its raised position. The jaw 13 is slowly lowered onto the roller 32 while roller 32 is in the raised position shown in FIG. 1. Then, the roller 32 is hydraulically lowered into the position shown in FIG. 2, lowering at the same time the jaw 13 in a controlled manner. Other means of lowering the jaw 13 may also be used. With jaw 13 lowered into the position shown in FIG. 2, the pipe fitting "T" is positioned onto the lower jaw half 14B. The upper jaw half 14A is then clamped into position over the jaw half 14B and hydraulically locked into position, securely clamping the pipe fitting "P".

In normal fusing of straight pipe sections, the joined run of pipe extends outwardly in a direction away from the jaws 13 and 14—in FIGS. 1 and 2 to the left. The length of pipe being joined to the pipeline is positioned in the moveable jaws 15 and 16.

However, when joining fittings such as fitting "T", the fusion to a straight pipe "P" is normally made before the pipe "P" is connected to the previously-joined lengths of pipe "P". Thus, the fitting "T" can be positioned in the fixed jaw 14.

Fine adjustments are made to place both pipe "P" and fitting "T" in exact axial alignment with each other and at an approximately equal distance from each other. After alignment is complete, the facing tool 30 is pivoted into the space between the pipe "P" and fitting "T" and rotated to properly face the pipes by producing a perfectly flat, properly aligned face on the pipe surfaces to be butt fused.

After facing takes place, pipe "P" in the movable jaws 15 and 16 is repositioned and the heating assembly 25 is pivoted into the space between the pipe "P" and fitting "T", and the adjacent edges are heated to the proper temperature. When proper temperature has been reached, the heating assembly 25 is pivoted out of the space between the pipe "P" and fitting "T", and pipe "P" in the movable jaws 15 and 16 is shifted axially forward towards the fitting "T" in jaw 14. When the adjacent edges of the pipes meet, the melted plastic merges, and forms a completely integrated, unitary mass and a uniform circumferential fusion bead forms at the joint. This position is held until the plastic has cooled and hardened. The jaws 14–16 are opened and the pipe "P" with the fitting "T" now properly attached is removed from the butt fusion machine 10.

For attachment to the run of the pipeline, it is positioned in the butt fusion machine 10 in the direction opposite from the position in which it was formed, i.e., with the fitting "T" projecting outwardly from the moveable jaws 15 and 16. A butt fusion apparatus with means for changing quickly between straight pipe and pipe fitting attachment positions and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In an apparatus for attaching abutting ends of first and second coaxial pipe sections together, and including a support frame; first and second coaxially-aligned, fixed pipe clamping jaws carried by the support frame in a raised position for positioning the first pipe section in a fixed position, at least one axially-movable pipe clamping jaw carried by said support frame for axial movement of the second pipe section relative to said fixed clamping jaws and into abutment with said first pipe section for being joined thereto; said first and second fixed clamping jaws and said axially-moveable clamping jaw each comprising respective upper and lower jaw halves pivotally cooperable with each other for movement between an open pipe receiving position and a closed pipe clamping position; and joining means for joining the first and second abutted pipe sections together;

the improvement comprising clamping jaw pivot means mounting said first clamping jaw for pivotal movement between said raised, coaxial pipe-clamping position and a lowered position wherein said entire first clamping jaw is positioned substantially perpendicular to said second clamping jaw for permitting a fitting which would otherwise interfere with the first clamping jaw to be attached to the second pipe section.

2. In an apparatus according to claim 1, wherein said clamping jaw pivot means comprises first and second laterally-spaced pivot brackets fixed to said support frame and defining a pivot axis perpendicular to the longitudinal axis of the first and second coaxial pipe sections.

3. In an apparatus according to claim 2, wherein said brackets include first and second coaxial hinge pins secured to said first fixed clamping jaw and extending through hinge pin bores in respective brackets, and further wherein said pivot axis is adjacent an end of the first fixed clamping jaw in the direction of pivot into the lowered position.

4. In an apparatus according to claim 3, wherein said clamping jaw pivot means includes:

(a) a mounting plate mounted on said support frame and extending laterally from one of said pivot brackets to the other of said pivot brackets;

(b) a base plate carried by said first clamping jaw and extending laterally from one of said pivot brackets to the other of said pivot brackets and pivotable between said first position wherein said pivot is positioned in overlying alignment with the mounting plate and said second position wherein said base plate is pivoted away from said mounting plate; and (c) locking means for locking said base plate in overlying alignment with the mounting plate when the first clamping jaw is positioned in said raised, coaxial pipe-clamping position.

5. In an apparatus according to claim 4, wherein said locking means comprise a plurality of spaced-apart nut-and-bolt assemblies.

6. In an apparatus according to claim 1, and including pipe support means pivotally mounted on said support frame for supporting said first pipe section in coaxial position with said second pipe section in said raised position and pivotable into a lowered position for supporting the first clamping jaw in its lowered position.

7. In an apparatus according to claim 6, wherein said pipe support means includes hydraulic movement means for lowering said first clamping jaw into its lowered position and raising said first clamping jaw into its raised position.

8. In an apparatus according to claim 7, wherein said pipe support means comprises a pair of arms laterally mounted by a first end of said arms in spaced-apart relation on said support frame and a roller mounted on an opposing, second end of said arms.

9. In an apparatus according to claims 1, 2, 3, 4, 5, 6, 7 or 8, wherein said apparatus is adapted to thermally fuse plastic pipe and pipe fittings.

10. A method of quickly reconfiguring an apparatus between a first position for attaching abutting ends of first and second coaxial pipe sections together and a second position for attaching a pipe fitting to said second coaxial pipe section, wherein said apparatus includes a support frame; first and second coaxially-aligned pipe clamping jaws carded by the support frame in a raised position for positioning the first pipe section in a fixed position, at least one axially-movable pipe clamping jaw carried by said support frame for axial movement of the second pipe section relative to said fixed clamping jaws and into abutment with said first pipe section for being joined thereto, said first and second clamping jaws and said axially-moveable clamping jaw each comprising respective upper and lower jaw halves pivotally cooperable with each other for movement between an open pipe receiving position and a closed pipe clamping position; and joining means for joining the first and second abutted pipe sections together, the method comprising the step of pivoting said first clamping jaw between said raised, coaxial pipe-clamping position and a lowered position wherein said entire first clamping jaw is positioned substantially perpendicular to said second clamping jaw for permitting a fitting which would otherwise interfere with the first clamping jaw to be attached to the second pipe section.

11. A method according to claim 10, including the step of locking said pivotally-movable first clamping jaw in said raised, coaxial pipe-clamping position.

* * * * *